Oct. 5, 1926.
C. MARCH
CLEANER AND CUTTER
Filed April 26, 1926
1,602,032
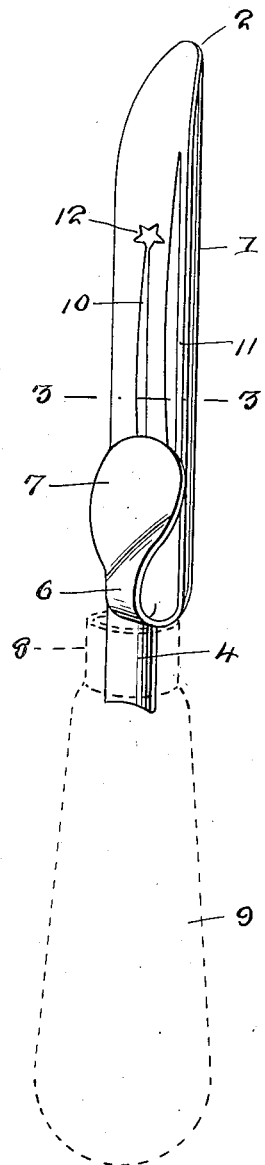
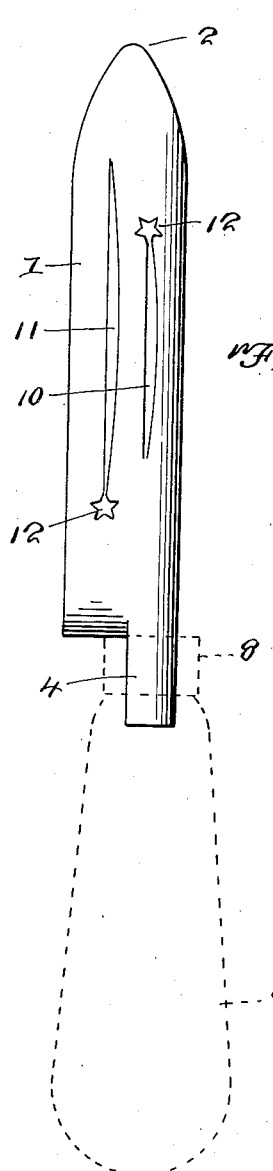
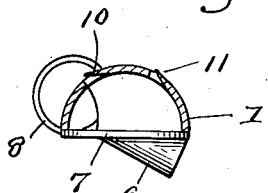
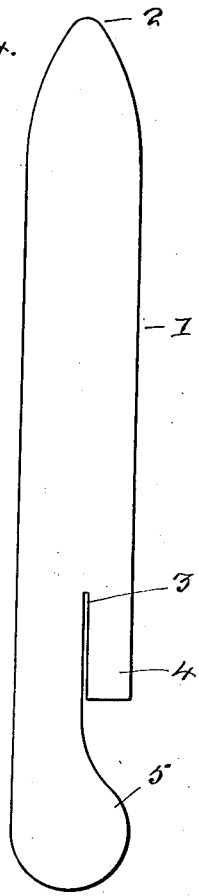
Carl March
INVENTOR
BY Victor J. Evans
ATTORNEY
WITNESS:

Patented Oct. 5, 1926.

1,602,032

UNITED STATES PATENT OFFICE.

CARL MARCH, OF CHICAGO, ILLINOIS.

CLEANER AND CUTTER.

Application filed April 26, 1926. Serial No. 104,813.

My present invention has reference to a paring and coring knife adapted for peeling and coring fruit or vegetables and of a construction to prevent unnecessary waste of the fruit or vegetables being cored or peeled.

A further object is the provision of an implement for this purpose which is simple, strong and durable and which includes a blade that is curved in cross section throughout its length and having an outer pointed end and the body thereof formed at spaced intervals with longitudinally extending cutting elements, each merging into a star-shaped opening or irregular passage, the said blade being integrally formed with a shank and with a thumb piece or rest, the shank permitting the blade to be easily connected to a handle and the thumb piece serving as a guide for the thumb of the operator when the device is manipulated.

The drawings which accompany and form part of this application illustrate a satisfactory embodiment of my improvement.

In the drawings:

Figure 1 is a perspective view of the improvement.

Figure 2 is a plan view thereof looking toward the outer face of the blade.

Figure 3 is a sectional view on the line 3—3 of Figure 1.

Figure 4 is a plan view of the blank from which the blade is formed.

My improvement comprises a metal member which is comparatively long and of a desired width. As disclosed by Figure 4 of the drawings, the blade is formed from a blank and the said blade is rounded transversely upon itself to provide a member 1 which is curved in cross section throughout its length. The outer end of the blade is pointed, as at 2, and the inner end thereof is centrally slitted longitudinally, as at 3, to provide a shank for and a part which is wider than the shank and extends therebeyond. This part, indicated by the numeral 5 in Figure 4 of the drawings has its outer end widened and rounded. The shank 4 is rounded in cross section to conform to the shape of the blade, but the part 5 is rounded laterally, as at 6, and from thence is extended into the hollow body portion of the blade. This extension has one of its edges contacting with one of the edges of the blade but the main portion of the said extension is not in engagement with the blade. The extension provides a thumb rest which is indicated by the numeral 7 in Figures 1 and 3 of the drawings. The shank 4 is adapted to be received in a ferrule 8 arranged on one end of a handle 9 (dotted lines in Figures 1 and 2). The blade 1, at suitable points from the longitudinal center thereof, is slitted longitudinally. One wall of each of the slits is arched, and the metal bounded by the slits is bent outwardly to provide cutting elements 10 and 11, respectively. The element 10 is of a greater length than the element 11, and both of these elements merge into star-shaped openings 12, respectively, the said openings being disposed at the opposite ends of the respective cutting elements 10 and 11.

By providing my improvement with the shank 4, it will be noted that the blade may be easily and quickly attached to the handle 9. By forming the same with the finger piece or grip 7 the blade can be manipulated in an easy and more accurate manner than can such devices of an ordinary construction. The rounded end 6 of the thumb piece permits of moisture passing between the said thumb piece and the blade and by providing the blade with the irregular or star-shaped openings at the terminals of the respective cutting elements 10 and 11 and by sharpening the walls around these openings, the blade may be employed for removing eyes from potatoes and for other purposes.

Having described the invention, I claim:—

An implement for the purpose set forth including a blade which is curved in cross section throughout its length and which is centrally formed, at a point adjacent to its inner end, with an inwardly rounded portion that is arranged over but out of contact with the concaved face of the blade and which portion has an angle extension which is widened and has one of its edges in contact with one of the edges of the blade to provide a thumb rest.

In testimony whereof I affix my signature.

CARL MARCH.